March 25, 1952  A. S. VITALE  2,590,805
ELECTRONIC RECTIFYING CIRCUITS
Filed Jan. 25, 1950  2 SHEETS—SHEET 1
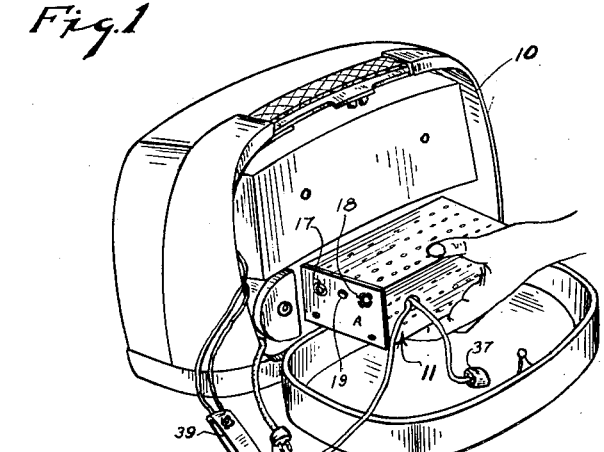
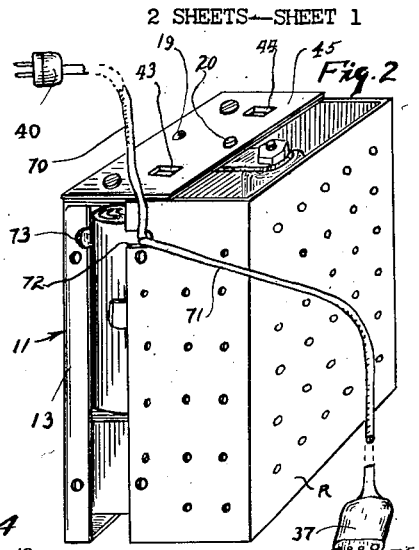
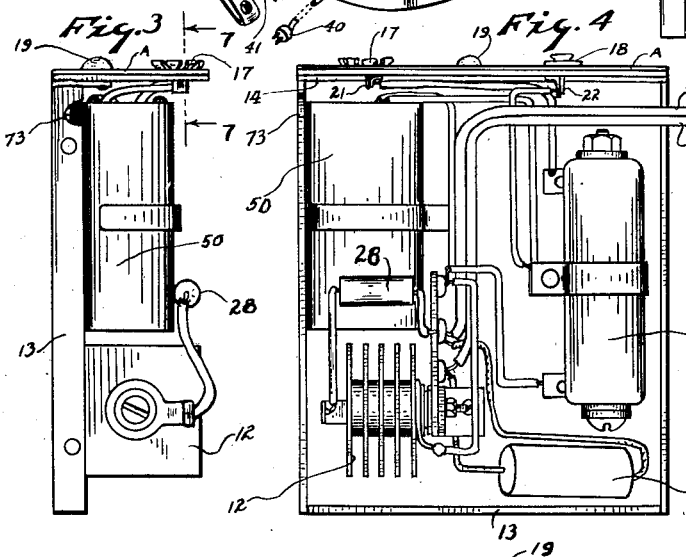
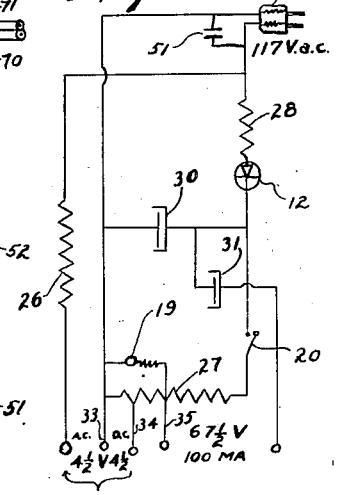
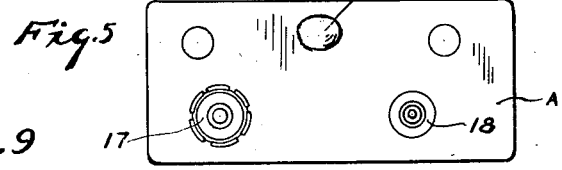
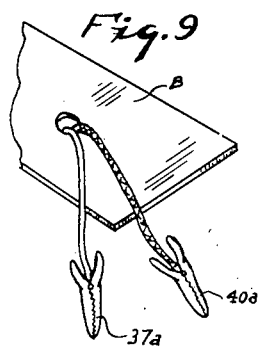
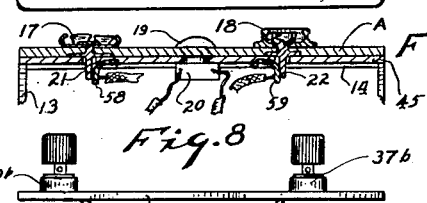
INVENTOR.
ANTHONY S. VITALE
BY
Laforest S. Saulsbury
ATTORNEY March 25, 1952  A. S. VITALE  2,590,805
ELECTRONIC RECTIFYING CIRCUITS
Filed Jan. 25, 1950  2 SHEETS—SHEET 2
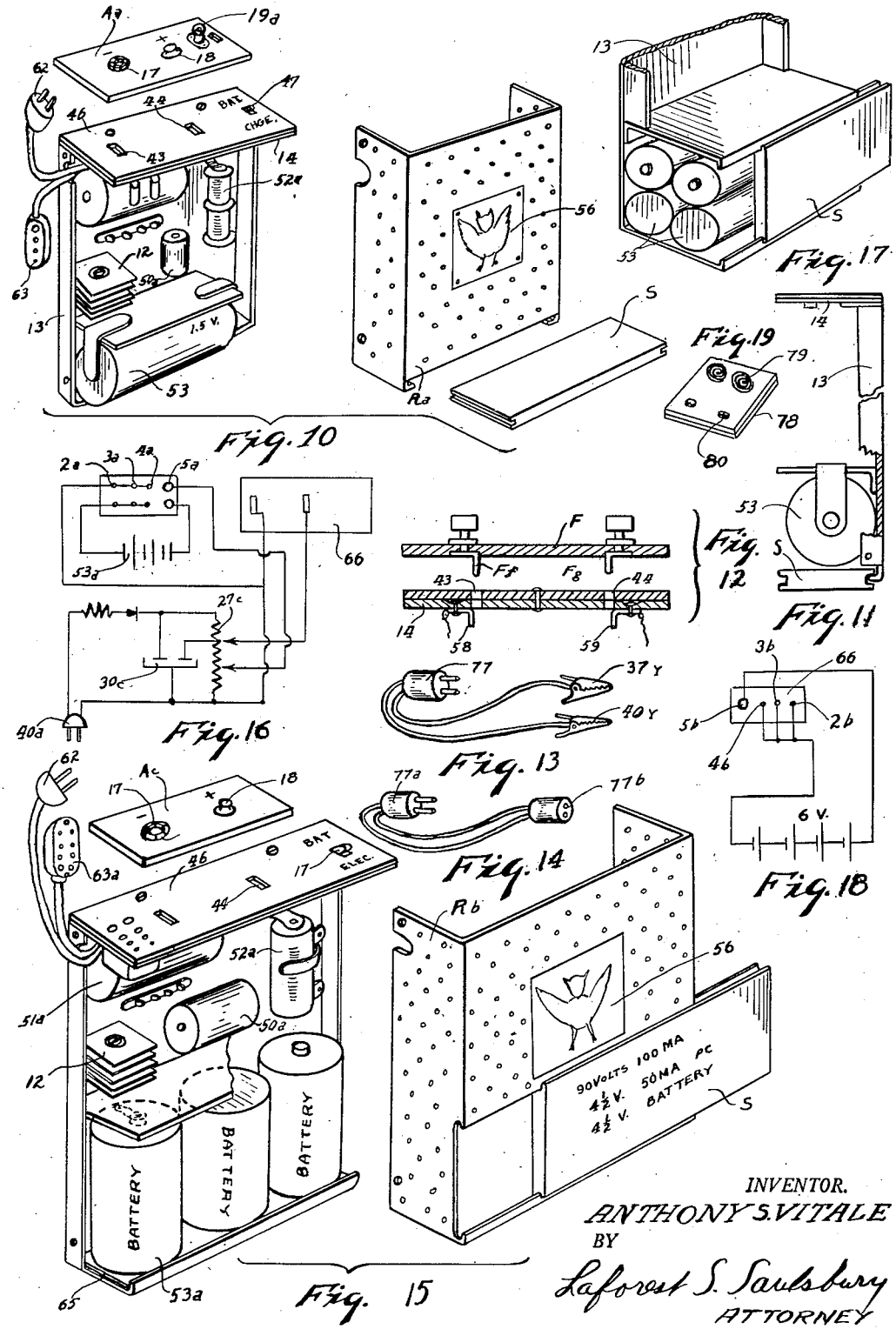
INVENTOR.
ANTHONY S. VITALE
BY
Laforest S. Saulsbury
ATTORNEY Patented Mar. 25, 1952

2,590,805

UNITED STATES PATENT OFFICE 2,590,805

ELECTRONIC RECTIFYING CIRCUITS

Anthony S. Vitale, Brooklyn, N. Y.

Application January 25, 1950, Serial No. 140,483

4 Claims. (Cl. 171—97)

This invention relates generally to electronic rectifying circuits and more particularly to apparatus for eliminating batteries in such apparatus as radios, hearing aids and other electronic instruments.

According to this invention, to meet an object thereof, means are provided for incorporating in otherwise ordinary battery circuits, an electronic rectifier comprising a selenium rectifier, to which a filtering circuit is added, the rectifier and filtering means being adapted to meet with the terminals used by B-battery connections, so that, if so decided upon, such battery may be dispensed with an ordinary electric current, as of a house circuit, used instead.

It is another object of this invention to provide in normal use of the present rectifier unit, switching means, which may be used in such way that the circuit may be closed when a desired predetermined kind is deemed necessary.

Still another object of this invention resides in the provision of apparatus for supplying D. C. current to electronic instruments which have heretofore been operated by A. C. supply, there being in the instant case rectifying means, as a feature of the invention.

Yet another of the present objects is to provide novel control means for the circuit embodying said rectifying device for use with electronic instruments using batteries and of the hearing aid type and also for radio apparatus, especially apparatus of a portable nature.

It is another object of the invention to provide a rectifying unit for electronic instruments with a casing structure including plug terminal openings wherein different adapters can be applied to the casing structure so that the unit can be adapted for the different fittings of the different instruments.

It is another object of the invention to provide a combined rectifying and battery unit for electronic instruments and having terminals suitable for hooking the instrument wires to either the battery circuit or the rectifier circuit.

For other objects and for a better understanding of the invention, reference may be had to the following detailed description taken in connection with the accompanying drawing, in which Fig. 1 is an exploded view, in perspective, in which the present electronic rectifier unit is being applied to a portable radio receiver.

Fig. 2 is an exploded perspective view of the replaceable electronic rectifier unit free of the radio receiver.

Fig. 3 is a side elevational view of the chassis of the unit removed from the cover part with the adaptor plugged in.

Fig. 4 is a plan view of the unit chassis showing the various parts and the wiring between them.

Fig. 5 is a top plan view of the plug-in type adaptor for use with the electronic rectifier unit with snap-on terminals of "B" battery supply.

Fig. 6 shows an electric circuit wiring diagram, in which rectifier elements are used in a replacement arrangement for "B" and "A" battery current supply.

Fig. 7 is a sectional view taken on line 7—7 of Fig. 3.

Fig. 8 is a side elevational view of a binding post type of adaptor used herein.

Fig. 9 is a fragmentary view of another adaptor using alligator clip for use when charging "B" batteries.

Fig. 10 is an exploded view of a combined "A" battery and a rectifier unit and cover therefor.

Fig. 11 is a fragmentary elevational view showing a modified form of a combined "A" battery and rectifier unit using a different slide cover for the battery compartment and the bottom of the unit.

Fig. 12 is a sectional view of an adaptor and portions of a cooperating casing.

Figs. 13 and 14 are perspective views of modified connecting plugs with different attaching clip terminals for battery charging connections.

Fig. 15 is a collective and perspective view similar to Fig. 10, but showing a combined "A" battery and rectifier unit wherein the battery compartment has space for a plurality of batteries.

Fig. 16 is a wiring diagram for the unit shown in Fig. 15.

Fig. 17 is a fragmentary perspective view of another "A" battery and rectifying unit having another "A" battery arrangement.

Fig. 18 is a wiring diagram of the battery circuit used in the unit shown in Fig. 17.

Fig. 19 is a perspective view of insulated connections for the battery circuit of Figs. 17 and 18.

By use of adjustable or fixed resistors as herein disclosed, a voltage output of 1.5 to 135 volts D. C. is obtainable, this being of direct current of the order of 100 milliamperes or more. This voltage can be adjusted so as to supply 28 volts D. C. for use with different types of equipment, such as motors and relays. The instant arrangement further has a neon indicating light so as to indicate that the D. C. voltage or power is acting so that functioning of the circuit is always evident. Included in the circuit is a safety switch by means of which a push button is utilized so that when the adaptor connections are made, the instrument may be placed in an inoperative condition, if so desired.

In the drawing, there is shown, with a usual hinged door, an electronic instrument such as a radio receiver cabinet 10 into which may be placed my portable electronic rectifier unit 11, comprising a rectifier circuit as illustrated in Fig. 6. This unit 11 is capable of serving in the manner disclosed herein, to replace the usual dry cell or battery power source heretofore used with such instruments.

The unit 11 includes a selenium rectifier 12, which is mounted on a chassis 13 and is adapted to be placed in the cabinet 10, and thereby rendering the rectifier unit suitable for cooperating with different types of electronic instruments, such as those specified, different adaptors may be used, and a number of such adaptors are herein shown. The rectifying circuit is insulated from the chassis and the parts are so connected to the chassis that the unit is shock-proof and can be treated like a battery unit.

In Figs. 3 and 4, for example, the chassis 13 is shown, the same having therein slots as seen in Fig. 7, to receive conductors 21 and 22, leading from terminals 17 and 18 of an adapter A, the latter having thereon a lamp 19 energized through switch means 20, when said terminals are connected with a line source.

The cap terminal 39 of the cabinet 10, Fig. 1, connects with said terminals 17 and 18 on the rectifier 11, when in said cabinet. A plug 41 connects with a group plug 37 to supply A voltage for the filaments of cabinet 10 from 1½ to 9 volts and over. The plug 40 of unit 11 connects the unit to an A. C. or D. C. source. As shown in Fig. 9, an adaptor plate B, with alligator clips 40a and 37a, is used when the unit is to be connected to a radio "B" battery of the same voltage to charge the battery.

In Fig. 8 there is an adaptor plate C having binding posts 40b and 37b. Terminals 40c and 37c enter openings in the top of the unit. The several adaptors are preferably made of molded plastic material.

As seen in Fig. 2, the terminal group plug 37 has a main conductor 5 and three return conductors 4, 3 and 2. Any one of these three return conductors may act with mating terminals, as is usual with apparatus of this kind, to accommodate the different spacings of the different plugs for the different instruments. In the illustration of Fig. 2, there is shown a perforated cover R for the rectifier 11, this cover having therein an insulated notch 72 for wiring leads 70 and 71, mating with insulated notch 73 of the chassis 13.

As represented in the diagram of Fig. 6, the plug 40 connects with a power source and the wiring includes a resistor 26, capacitors 30 and 31, rectifier output 12, jack elements 32, 33, 34, 35 and 36, a variable or fixed resistor 27, a resistor 28, neon light 19, and a control switch or button 24. The value of the voltages thus obtainable is indicated in the diagram, Fig. 6, that is to say 4½ volts A. C., 4½ volts D. C. and 67½ volts D. C., with said respective elements. While these voltages are shown on the diagram, they may be changed to 1½ volts A. C.-D. C. for filament "A" supply and 1½ volts to 400 volts D. C. for "B" supply.

Operation of the structures shown in Figs. 10 to 18 inclusive is similar in principle to that of the devices already described above. The aforesaid chassis 13 includes an inwardly bent top plate portion 14, to which is connected a plate 45 having slots 43 and 44, Fig. 2. Slots 43 and 44 in a plate 46, Fig. 10, are the same as the first-mentioned slots, each plate having also therein fastening elements or screws, as shown, fastening the same to the chassis plate portion 14. The plate 46 is like the plate 45 of Fig. 2, the former having in it a switch 47 controlling a lamp 19a, in an adaptor Aa, in which terminals 18 and 17 are the same as aforesaid.

Other corresponding elements in the different figures are also substantially the same, it being seen in Fig. 10 that there are a rectifier 12, by-pass capacitor 50a, filter condenser 51a, and a fixed or adjustable voltage divider 52a, said capacitor, condenser and divider having in Figs. 3 and 4 reference characters 50, 51 and 52. In Fig. 10 there is shown a dry cell or battery 53 which may be of 1½ volts or more, consisting of one to six dry cells to produce 1½ volts, 3 volts, 4½ volts, 6 volts, 7½ volts and 9 volts. A cover Ra of Fig. 10 may have therewith a slide similar to a slide of Fig. 15, on which latter informative lettering appears. The cover Ra of Fig. 10 may have thereon a special mark or crest 56, and that of the cover Rb of Fig. 15 may have a like crest or mark 56. The bleeder resistor 52, Fig. 4, is wire wound and variable tapped, but may be fixed. A carbon resistor may be used.

Other corresponding elements are identified by the same characters in different figures, and with a chassis 13 of Fig. 17, there are shown a number of batteries 53, which may be connected in series in the usual manner to produce 6 volts D. C. for "A" supply to the plug 37, Fig. 2.

Plug 63 is of plastic. Likewise are plugs 37, 40 and 41, Fig. 2. In Fig. 15, there is a double plastic plug 63a and as indicated in Fig. 16, which has two rows of terminals.

In said Fig. 15, on a base of insulation 65, there are three batteries 53a and the other elements of this figure are like those similarly marked, Fig. 10.

The electric circuit of Fig. 16 includes a plug 40c, a resistance 27c, filter capacitors 30c and batteries 53a. This circuit further includes two rows of conductor elements 5a, 4a, 3a and 2a, one row of which being connected to the batteries to produce 1½ volts to 9 volts, depending on the number of battery cells used, the other row of conductor elements supplying independently similar voltages from the rectifying circuit and a current of 50 milliamperes, more or less. In Fig. 18, four 1½ volt batteries, as shown, connect at opposite ends thereof with a plug 66 having suitable conductors 5b, 4b, 3b and 2b.

In Fig. 11, there is a battery 53 and chassis 13 with a plate 14, and slide S movable lengthwise along the bottom of the chassis 13.

With a plug 77 in Fig. 13, there are clip terminals 37y and 40y, and with a plug 77a, Fig. 14, an attaching plug 77b. These plugs and terminals are used for battery charging connections.

The showings of Fig. 12, although sectional, are likewise substantially similar to other adaptor elements herein, the adaptor F thereof having terminals Ff and Fg, and there being on plate 14 registering apertures 43 and 44, and aligned terminals 58 and 59 for connection with the terminals Ff and Fg. In Fig. 19, there is a contact plate 78 with spring contacts 79 and button contacts 80 thereon. This contact plate engages the ends of batteries 53 in Fig. 18.

While various changes may be made in the detail construction, it shall be understood that such changes shall be within the spirit and scope of the present invention as defined by the appended claims.

What is claimed is:

1. A replaceable rectifier unit for use with electronic instruments comprising a chassis having rectifier elements thereon arranged in circuit relationship with one another and a top plate portion, said top plate portion having spaced recesses and contacts aligned with said recesses, a plug adaptor having prongs adapted to enter the recesses of the plate to engage with the contacts thereof and having contact terminals adapted to receive contact wires of the electronic instrument, said top plate of the chassis adapted to close one end of the unit, a cover carried on the chassis to enclose the rectifying elements thereupon, said plug adaptor extending the full area of the top portion of the chassis and adapted to be replaced by other plug adaptors to render the rectifying unit suitable for the different types of connections of the different electronic instruments.

2. A replaceable rectifier unit for use with electronic instruments comprising a chassis having rectifier elements thereon arranged in circuit relationship with one another and a top plate portion, said top plate portion having spaced recesses and contacts aligned with said recesses, a plug adaptor having prongs adapted to enter the recesses of the plate to engage with the contacts thereof and having contact terminals adapted to receive contact wires of the electronic instrument, said top plate of the chassis adapted to close one end of the unit, a cover carried on the chassis to enclose the rectifying elements thereupon, said plug adaptor extending the full area of the top portion of the chassis and adapted to be replaced by other plug adaptors to render the rectifying unit suitable for the different types of connections of the different electronic instruments, and said top plate having a push button switch projecting outwardly thereof, said adaptor upon engaging its prongs with the contacts of the top plate serving to actuate the push button switch and to condition the unit for energization.

3. A replaceable rectifier unit for use with electronic instruments comprising a chassis having rectifier elements thereon arranged in circuit relationship with one another and a top plate portion, said top plate portion having spaced recesses and contacts aligned with said recesses, a plug adaptor having prongs adapted to enter the recesses of the plate to engage with the contacts thereof and having contact terminals adapted to receive contact wires of the electronic instrument, said top plate of the chassis adapted to close one end of the unit, a cover carried on the chassis to enclose the rectifying elements thereupon, said plug adaptor extending the full area of the top portion of the chassis and adapted to be replaced by other plug adaptors to render the rectifying unit suitable for the different types of connections of the different electronic instruments, and lead wires projecting through the side of the chassis and the cover and adapted for the connection of the unit with a wall receptacle.

4. A combined rectifying and battery unit for electronic instruments comprising a chassis having a top plate construction with spaced openings therein, contact elements carried by the top plate construction aligned with the openings, a plurality of rectifying elements carried on the chassis, battery means carried upon the chassis, a cover adapted to be fitted over the chassis and having an opening therein to provide access to the battery, a slide closure operable within the opening of the cover, and a plug adaptor having prong projections adapted to fit over the top plate so that its prong projections extend through the spaced openings of the top plate into engagement with the contact elements and change-over switch means carried by the top plate and operable to effect use of the rectifying unit or the battery, cables extending from the chassis and having contact plugs thereon.

ANTHONY S. VITALE.

REFERENCES CITED

The following references are of record in the file of this patent:

UNITED STATES PATENTS

| Number | Name | Date |
| --- | --- | --- |
| 2,028,191 | Chereton | Jan. 21, 1936 |
| 2,248,370 | MacTaggart | July 8, 1941 |
| 2,347,452 | Amsden | Apr. 25, 1944 |
| 2,485,450 | Kotterman | Oct. 18, 1949 |